(12) United States Patent
Norris

(10) Patent No.: US 7,333,316 B1
(45) Date of Patent: Feb. 19, 2008

(54) AC POWER LINE PROTECTION USING THYRISTORS

(75) Inventor: Richard G. Norris, Grapevine, TX (US)

(73) Assignee: Littelfuse, Inc., Des Plaines, IL (US)

( * ) Notice: Subject to any disclaimer, the term of this patent is extended or adjusted under 35 U.S.C. 154(b) by 299 days.

(21) Appl. No.: 10/421,060

(22) Filed: Apr. 23, 2003

(51) Int. Cl.
*H02H 3/22* (2006.01)
(52) U.S. Cl. ..................................... 361/111
(58) Field of Classification Search ............. 361/15, 361/111, 118, 119; 323/270
See application file for complete search history.

(56) References Cited

U.S. PATENT DOCUMENTS

| | | | | |
|---|---|---|---|---|
| 3,781,608 | A * | 12/1973 | Geiger ........................ | 361/100 |
| 4,164,772 | A * | 8/1979 | Hingorani ..................... | 361/58 |
| 4,217,619 | A | 8/1980 | Tibolla | |
| 4,926,280 | A * | 5/1990 | Richter et al. ................ | 361/15 |
| 5,127,085 | A * | 6/1992 | Becker et al. ............... | 318/434 |
| 5,479,031 | A * | 12/1995 | Webb et al. ................. | 257/173 |
| 5,786,685 | A | 7/1998 | Lange et al. | |
| 5,883,775 | A | 3/1999 | Maytum | |
| 5,969,516 | A * | 10/1999 | Wottrich ...................... | 324/67 |
| 6,043,636 | A | 3/2000 | Gaudreau et al. | |
| 6,157,529 | A | 12/2000 | Ahuja | |
| 6,226,166 | B1 * | 5/2001 | Gumley et al. ............. | 361/118 |
| 6,229,682 | B1 * | 5/2001 | Mechanic .................... | 361/111 |
| 6,282,073 | B1 | 8/2001 | Glaser et al. | |
| 6,282,075 | B1 * | 8/2001 | Chaudhry .................... | 361/111 |
| 6,348,782 | B1 | 2/2002 | Oughton, Jr. et al. | |
| 6,400,586 | B2 | 6/2002 | Raddi et al. | |
| 6,445,144 | B1 | 9/2002 | Wuidart et al. | |
| 6,560,079 | B1 * | 5/2003 | Hirsh et al. .................. | 361/42 |
| 6,639,779 | B2 * | 10/2003 | Knigge et al. .............. | 361/119 |

OTHER PUBLICATIONS

Thyristors—Advanced Power Switching, STMicroelectronics Web Page, 2003, SMDB3 Thyristor Data Sheet, 2 pages.

* cited by examiner

*Primary Examiner*—Ronald W. Leja
(74) *Attorney, Agent, or Firm*—Roger N. Chauza, P.C.

(57) ABSTRACT

A transient suppressor circuit for use in suppressing transient voltages superimposed on AC power conductors. The transient suppressor circuit includes a threshold thyristor connected in series with a capacitor. The transient suppressor circuit is connected across the AC power conductors. In response to a transient voltage superimposed on the AC power conductors, the thyristor is triggered into conduction. The series capacitor has a capacitance such that it represents a low impedance to the transient voltage, but a high impedance to the AC power line frequency. Accordingly, the triggering of the thyristor shunts high frequency transient currents to ground via the low impedance of the capacitor, but does not shunt low frequency AC power currents to ground because of the high capacitive impedance. Circuit fuses are thus not blown in response to low frequency overvoltages.

23 Claims, 3 Drawing Sheets

AC POWER LINE PROTECTION USING THYRISTORS

TECHNICAL FIELD OF THE INVENTION

The present invention relates in general to circuits for protecting AC-driven circuits from transient voltages, and more particularly to the use of thyristors for protecting electronic circuits from the harmful effects of transient voltages carried on the AC power lines.

BACKGROUND OF THE INVENTION

AC power line voltages of various magnitudes are conventionally used as a source of power to drive other circuits. AC power line voltages are available at every house, business and in most geographical areas for powering electrical equipment. AC voltages generated by stationary or mobile generators, such as utility generators, are used to generate AC voltages for powering industrial machines, aircraft, etc. In certain instances, inverters are used to convert DC voltages into corresponding AC voltages to provide a source of AC energy.

AC power line voltages in the United States are characterized by a sine wave having an RMS value of about 110 volts and a peak value of about 155 volts. The power line voltage is susceptible to transient voltages imposed thereon. The transient voltages can arise from lightning strikes to the power lines, inductive circuits such as electric motors starting or stopping, and the switching of electric utility lines at substations. Transients on the order of a thousand volts, or more, can be imposed on the AC power lines as a result of the foregoing.

The AC voltages that are available for powering electrical machines and circuits are typically converted to another type of electrical energy. For example, AC voltages are often converted to DC voltages for powering electronic circuits such as computers, radios, televisions, household appliances, fax machines, telecommunications equipment and circuits, control systems, etc. These and numerous other types of electrical equipment utilize semiconductor circuits for controlling electrical signals to accomplish desired functions. Semiconductor circuits are susceptible to damage due to transient voltages that exceed the safe operating voltage of the semiconductor devices. Accordingly, there are numerous overvoltage protection circuits that have been designed to protect semiconductor circuits from the adverse affects of overvoltages. Transistors, silicon controlled rectifiers (SCRs), triacs, other thyristors, metal oxide varistors (MOVs), Zener diodes and many other types of semiconductor devices are used in overvoltage protection circuits. In general, overvoltage protection circuits are threshold sensitive so that when a transient voltage exceeds the threshold, the overvoltage protection circuit triggers or otherwise conducts to clamp the overvoltage to a safe level and shunt the resulting current away from the circuits to be protected. Many overvoltage protection circuits are not designed to carry large sustained overcurrents resulting from an overvoltage, but rather rely on upstream fuses or circuit breakers to operate and isolate the circuits from the overvoltage and overcurrent conditions.

As noted above, there are many types of solid state devices that have been used in overvoltage protection circuits. The MOV is a popular device for clipping voltage transients above specified thresholds. While the MOV is well adapted to absorb high levels of overvoltage energy, such devices are not responsive to high speed transients, they degrade over time, and they do not have well defined voltage thresholds. Newer semiconductor devices have been developed that are responsive to high speed transients and have well defined breakover voltages. Such devices are known as SIDACtor® overvoltage protection devices and are obtainable from Teccor Electronics of Irving, Tex. The SIDACtor overvoltage protection devices are constructed as avalanche devices and thus exhibit negative resistance characteristics. U.S. Pat. No. 5,479,031 by Webb, et al. discloses the structural and operational features of SIDACtor overvoltage protection devices. It has been known to utilize a series combination of a SIDACtor overvoltage protection device and an MOV to provide transient protection to AC lines.

While overvoltage protection circuits may be handy, optional or required, it is generally a requirement that such circuits be simple and cost effective. Another design criteria is that such circuits be fast acting and transparent to the operation of the circuit to be protected. Another design consideration is for such overvoltage protection circuits to be nondestructive and less prone to degradation after one or more operations. Another consideration is that the overvoltage protection circuits do not trigger on the peak amplitude of the AC voltage itself, but only on voltage transients superimposed on the AC waveform. Moreover, such overvoltage protection circuits should be designed to return to the non-conductive state when the transient is no longer present, even though the AC voltage remains present. If the overvoltage protection circuit remains conductive after the transient has disappeared, the overvoltage protection circuit would become overheated and destroyed due to the energy available by the AC power source. In this instance, the overvoltage protection circuits would have to be constructed of unnecessarily heavy duty components, thereby rendering the circuits cost prohibitive.

As an example to the foregoing, if a thyristor device were to be connected directly across a 110 volt AC line and designed to provide a breakover or threshold voltage of 200 volts, such thyristor device would remain transparent to the other downstream circuits connected to the AC line, for all AC line voltages that do not exceed the threshold voltage of 200 volts. In the event that a transient voltage exceeding the amplitude of the threshold voltage appears on the AC line, the thyristor device would be triggered into conduction to clamp the AC line to voltages that do not exceed the safe operating voltage of the circuits coupled to the AC line. During the time of conduction, the thyristor device not only conducts the current resulting from the transient voltage but also conducts the full AC current that can be supplied by the AC line. This can be substantial energy even for the half cycle, or so, in which the thyristor device conducts. The surge current that can be supplied by the AC line, if supplied by a conventional household outlet can be 1,000 amps or more. The amount of energy that is available from the 110 volt line is generally much more than can be sustained by the thyristor for any significant period or time.

When the AC voltage passes through a zero-voltage level and the transient is no longer present, the thyristor device will automatically turn off as the current conducted by the thyristor device will be less than the holding current of the device. On the other hand, if the voltage on the AC line continues to exceed the threshold voltage of the thyristor device, such as when 220 volts has been inadvertently connected to the 110 volt line, or when a transient exists for each AC cycle, then the thyristor device will continue to conduct. In this instance, unless a circuit breaker operates, a fuse blows, or another overcurrent protection device operates, the thyristor device may be destroyed.

In order to provide safe operation to the various overvoltage protection circuits, a fuse is generally coupled in series with the hot AC conductor. Thus, rather than allowing the AC energy to be dissipated across the components of the overvoltage protection circuit, the overcurrent flowing in the AC line will blow the fuse to thereby isolate the down stream section of the AC line. The faster the overvoltage protection circuit functions in response to transients, the higher the possibility of nuisance firings and corresponding blowing of the fuse.

The threshold sensitive devices identified above cannot be coupled directly from the hot AC conductor to ground for the reasons noted. The placement of a power resistor in series with the threshold sensitive device is not practical as the resistance can limit the effectiveness of the threshold sensitive device.

From the foregoing, transient suppressors could be enhanced by a simple circuit that is sensitive to the overvoltage transient itself, but is not sensitive to the underlying AC line voltage.

SUMMARY OF THE INVENTION

In accordance with the principles and concepts of the invention, there is disclosed a transient voltage suppressor for use with AC power circuits, where such transient voltage suppressor is responsive to high speed transient voltages carried on the AC waveform, but is not sensitive to the AC voltage itself.

In accordance with one embodiment of the invention, a transient voltage suppressor includes an overvoltage protection device connected in series with a capacitor, where the series combination of components is connected across the AC circuit supplying power to the electronic apparatus or equipment to be protected from the transient voltages.

The overvoltage protection device is preferably a low capacitance avalanche device, and the capacitor is preferably a large value capacitor to absorb the energy of the transient voltage. With this arrangement, when the avalanche device is in the non-conductive state, the low capacitance of the avalanche device presents a high impedance to the AC power voltage, and thus the transient voltage suppressor is transparent to the operation of either the AC circuit or the electronic equipment supplied power either directly or indirectly by the AC voltage.

In accordance with another embodiment of the invention, the transient voltage suppressor circuit includes a fuse and optionally a diode bridge and is connected internally in an AC circuit breaker to provide transient voltage protection to all equipment supplied with AC power via the circuit breaker.

In accordance with another embodiment of the invention, the transient voltage suppressor of the invention is constructed in a modular form which may be pluggable into a standard AC wall outlet. With this arrangement, the electronic equipment connected to the AC circuit serviced by the wall outlet is protected from harmful transient voltages.

With regard to yet another embodiment of the invention, the transient voltage suppressor of the invention is incorporated into a circuit breaker panel, between the power bus bars and the ground bus bar. All of the AC circuits serviced by the circuit breaker panel are thus protected against damage from harmful transient voltages.

According to another embodiment of the invention, a transient voltage protection circuit is provided for use with AC circuits. The transient voltage protection circuit includes an AC conductor for providing AC power, and a transient suppressor circuit which includes a thyristor device and a capacitor. The thyristor device and capacitor are connected in series and to the AC conductor. The capacitor has a capacitance value presenting a low impedance to transient voltages.

According to yet another embodiment, the invention provides a transient voltage protection circuit for use with AC circuits. The transient voltage protection circuit functions with first and second AC conductors for providing AC power to the AC circuits. A thyristor has a low capacitance in a nonconductive state, and a breakover voltage which, when exceeded, drives the thyristor into a state of conduction. The low capacitance of the thyristor presents a high impedance to a characteristic frequency of the AC voltage. A capacitor is connected in series with the thyristor. The capacitor has a large capacitance to provide a high impedance to AC voltages carried on the AC conductor. The series-connected capacitor and thyristor are connected across the AC conductors to present a high impedance to AC voltages carried on the AC conductor, and to present a low impedance for transient voltages superimposed on the AC voltage when the thyristor is in a state of conduction.

In accordance with yet other features of the invention, a transient suppressor circuit is incorporated into various structures and equipment, including a module, a circuit breaker, a line cord plug, a computer, office electronic equipment, home electronic equipment, and any other electronic circuit to be protected from the harmful effects of transient voltages.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
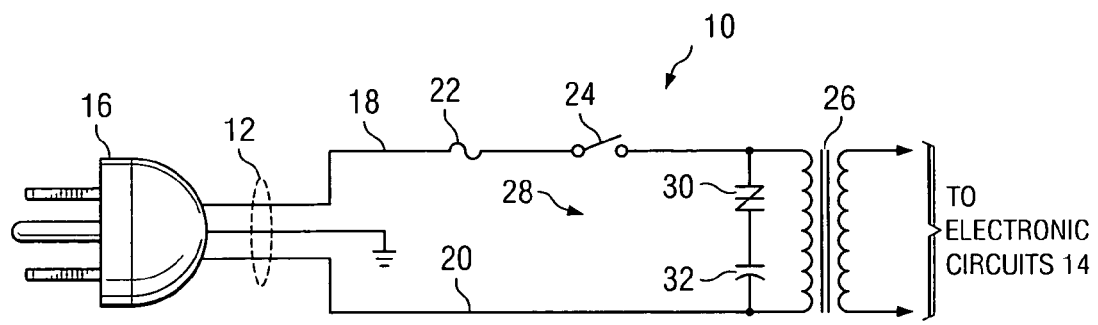
FIG. 1 is an electrical schematic drawing of an AC circuit employing a transient suppressor circuit constructed according to the principles and concepts of the invention.

With reference to FIG. 1, there is shown an AC circuit 10 used in conjunction with an AC line 12 for protecting electronic circuits 14 from damage due to transients carried on the AC line 12. In the illustrated AC circuit 10, a standard AC plug 16 is used to terminate the AC line 12 which includes a first conductor 18 and a second conductor 20. In typical 110 volt AC circuits, the first conductor 18 generally carries AC power and is thus termed a "hot" conductor. The second conductor 20 is generally a neutral conductor, i.e., it carries return current from the AC circuit being driven. In certain circumstances the second conductor 20 can be a ground conductor. Generally, AC plugs 16 carrying 110 volt service have a third terminal which is an earth ground connection. When the features of the invention are used with 220 volt AC service, both conductors 18 and 20 may be hot conductors which carry different phases of the 220 AC voltage. Depending on the particular situation, geographical area or country involved, the conductors 18 and 20 may by be driven or connected to different AC service voltages, neutrals or grounds, other than shown herein.

Connected in series with the first conductor 18 is a fuse 22 and a switch 24. The fuse is selected for a current rating which, if such current were to flow through the fuse 22, the fuse 22 would blow and isolate the downstream portion of the AC circuit 10 and associated electronic circuits 14. The downstream electronic circuits 14 would thus be protected from damage resulting from currents that equal or exceed the current rating of the fuse 22.

The switch 24 can be either a solid state switch or a standard mechanical switch. The function of the switch 24 is to switch AC power from the AC line 12 to the downstream electronic circuits 14, or disconnect the AC line 12 from the downstream electronic circuits 14. In the embodiment shown in FIG. 1, the AC conductors 18 and 20 are connected to the primary windings of a transformer 26. The transformer 26 is not essential to the invention, but is only an example of a typical component connected to an AC line 12. Connected to the secondary of the transformer 26 is the downstream electronic circuits 14 which may be any of a variety of semiconductor circuits. The electronic circuits 14 may include a power supply that converts AC power to DC power, may be digital or analog circuits, processors, memories or a host of other types of semiconductor circuits.

In accordance with an important feature of the invention, a transient suppressor circuit 28 includes a two-terminal thyristor 30 connected in series with a capacitor 32. The transient suppressor circuit 28 is connected across the AC conductors 18 and 20 and thus is connected in parallel across the primary of the transformer 16. Preferably, the thyristor 30 comprises a SIDACtor overvoltage protection device that responds very rapidly to voltages of either polarity exceeding the characteristic breakover voltage of the device. There are commercially available SIDACtor overvoltage protection devices with many different breakover voltages, current ratings, etc. The Teccor SIDACtor overvoltage protection devices are extremely high speed devices, have well-defined breakover voltages, and do not degrade in performance after repeated operations. In order to trigger in response to transient voltages superimposed on the AC voltage carried on the AC line 12, the SIDACtor overvoltage protection device 30 should have a breakover voltage of about 200 volts. This breakover voltage is acceptable as the peak voltage of a standard 110 volt line is about 156 volts. The difference between the peak AC voltage and the breakover voltage represents a margin to insure that the SIDACtor overvoltage protection device 30 does not trigger unnecessarily on voltages that are not otherwise harmful to the electronic circuits 14.

The capacitor 32 functions to provide a high impedance to the 60 Hz AC power (or other low frequency signal) so that AC current does not flow through the SIDACtor overvoltage protection device 30. To that end, the value of the series capacitor 32 is selected so as to provide a low impedance to the high frequency components of transient voltages, and provide a high impedance to low frequencies, such as power line frequencies. Those skilled in the art can readily determine the value of the series capacitor 32 so that the transient suppressor circuit 28 functions generally transparent to the 60 cycle voltage (i.e., a high impedance), but provides a low impedance path when the SIDACtor overvoltage protection device 30 is triggered into conduction by a transient voltage, or any other voltage exceeding the breakover voltage of the device 30.

As an example in connection with 60 Hz circuits, the capacitor 32 can be of an aluminum, electrolytic or other type with a value of about 1,000 microfarad to present a low impedance to transients having 100 amp amplitudes and lasting about one millisecond. These are typical parameters of transient voltages when considering the design of transient suppressor circuits for protecting electronic equipment from damage due to lightning strikes to the AC line. For satisfying other transient suppression constraints, the value of the capacitor 32 may be different. For transient voltages having less energy than that described above, the value of the capacitor 32 can be smaller than 1,000 microfarads. It is to be understood that the capacitor 32 should typically be large enough to store the energy of the transient to the extent that it is desired to suppress the transient. It is expected that capacitor values in the range of 100 to 10,000 microfarads would be suitable for use with the invention.

It is noted that the typical capacitance of SIDACtor overvoltage protection devices is in the neighborhood of 100 pf, or less. This value of device capacitance represents an impedance of over 20 megohm to a 60 cycle frequency. It is understood that the positions of the overvoltage protection device 30 and the capacitor 32 can be reversed in the series arrangement without adverse operational affects effects.

During normal operation of the AC circuit 10, the breakover voltage of the SIDACtor overvoltage protection device 30 is not exceeded and the transient suppressor circuit 28 remains transparent to both the AC circuit 10 and to the downstream electronic circuits 14. As noted above, the low capacitance of the overvoltage protection device 30, on the order of 100 picofarad or less, presents an impedance to the 60 Hz AC voltage in the range of megohms. In the event that the magnitude of a transient voltage superimposed on the AC waveform exceeds the breakover voltage of the overvoltage protection device 30, the device 30 will be triggered into conduction. The overvoltage protection device 30 thus presents a low impedance path between the hot AC conductor 18 and the series capacitor 32. At this point in time, the impedance between the AC conductors 18 and 20 is essentially the impedance presented by the series capacitor 32, which is in parallel with the impedance of the downstream circuits. The capacitance of the series capacitor 32 is selected to present a low impedance to the high frequency components of the transient voltage. A series capacitor with a capacitance of about 1,000 microfarads is expected to present a capacitive reactance of about 0.16 ohms (at 1 kHz) to transient voltages. As the frequency of operation increases, the capacitive reactance of a capacitor decreases. This low impedance of the capacitor 32, together with the low impedance of the overvoltage protection device 30 (in its conductive state), essentially short circuits the transient voltage from the first AC conductor 18 to the second conductor 20. By suppressing the transient voltage, it is not coupled to the downstream electronic circuits 14. The foregoing operation is applicable to transient voltages of either polarity, as the SIDACtor overvoltage protection devices 30 are bidirectional devices.

As to the AC voltage itself carried on the first AC conductor 18 during the presence of a transient, the SIDACtor overvoltage protection device 30 presents a high impedance and does not short circuit the AC voltage to the second conductor 20. The fuse 22 is thus not overloaded and does not blow. Preferably, the fuse 22 is a time delay or slow reacting type of fuse. Accordingly, the transient voltage does not cause a nuisance blowing of the fuse 22 and a corresponding down time of the electronic circuit 14 during replacement of the fuse 22. More importantly, the transient voltage superimposed on the 60 Hz AC voltage is not allowed to pass through the transformer 26 and damage the downstream electronic circuits 14.

The series arrangement of the SIDACtor overvoltage protection device 30 and the capacitor 32 can be supplemented with other components to more accurately define the frequency components to be short circuited from the hot AC conductor 18 to the ground conductor 20. For example, inductors can be used across the series capacitor 32, or in series with the capacitor 32, to provide a low impedance path for selected frequencies that may appear in conjunction with the AC voltage. In the practice of the invention, other threshold devices may be substituted for the SIDACtor overvoltage protection device 30. The transient suppressor circuit 28 can be used in connection with AC circuits other than 50-60 Hz power line frequencies, such as 400 Hz aircraft power generation systems, low frequency carrier transmission systems, industrial power generation systems, portable power generation systems, etc. With 400 Hz power systems, the capacitor 32 can be a smaller value.

Figure 2:
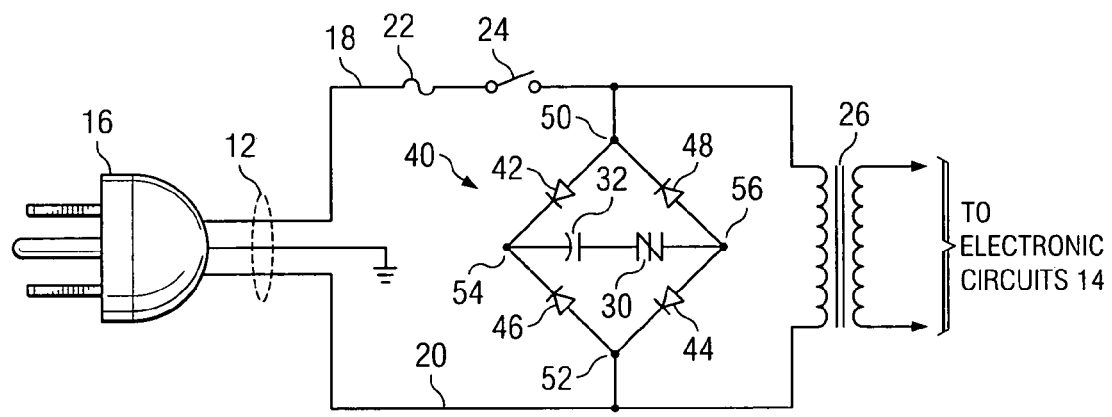
FIG. 2 is an electrical schematic drawing of another embodiment of the invention in which the transient suppressor circuit is incorporated into a bridge circuit.

FIG. 2 illustrates another embodiment of a transient suppressor circuit constructed according to the invention. Here, a diode bridge 40 is connected between the hot AC conductor 18 and the neutral conductor 20. The diode bridge 40 includes diodes 42-48 connected in a standard bridge arrangement. Node 50 of the diode bridge 40 is connected to the hot AC conductor 18 and node 52 of the diode bridge 40 is connected to the neutral conductor 20. Connected between diode bridge nodes 54 and 56 is the series-connected overvoltage protection device 30 and the capacitor 32. In this arrangement, the capacitor 32 need only be a polarized electrolytic capacitor, as the diode bridge 40 assures that the current flow through the capacitor 32 and the overvoltage protection device 30 is in one direction. More costly non-polarized electrolytic capacitors can be used, and in this event the diode bridge 40 is not necessary. The overvoltage protection device 30 and the capacitor 32 otherwise function in the same manner as described above to suppress transients without blowing the fuse 22.

Figure 3:
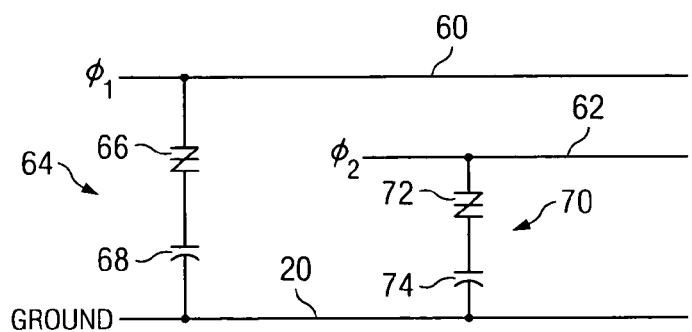
FIG. 3 is an electrical schematic diagram of a multiphase electrical power delivery system utilizing the transient suppressor of the invention.

FIG. 3 illustrates transient suppressor circuits configured for operation with multiple phases of AC voltage. This circuit configuration is well adapted for operation with standard two-phase 220 AC voltage. The first voltage phase is shown by AC conductor 60 and the second voltage phase is shown by AC conductor 62. Both voltage phases are referenced to a ground conductor 20. A first series-connected transient suppressor circuit 64 comprises a SIDACtor overvoltage protection device 66 connected in series with a capacitor 68. The first transient suppressor circuit 64 is connected between the first phase AC conductor 60 and the ground conductor 20. A second transient suppressor circuit 70 comprises a SIDACtor overvoltage protection device 72 connected in series with a capacitor 74. The second transient suppressor circuit 70 is connected between the second phase AC conductor 62 and the ground conductor 20. The first and second transient suppressor circuits 64 and 70 function in the same manner as described above. Each transient suppressor circuit 64 and 70 functions independent of each other as to respective transient voltages that may be superimposed on the associated AC conductors 60 and 62. Additional transient suppressor circuits can be used for each additional phase of the AC power.

Figure 4:
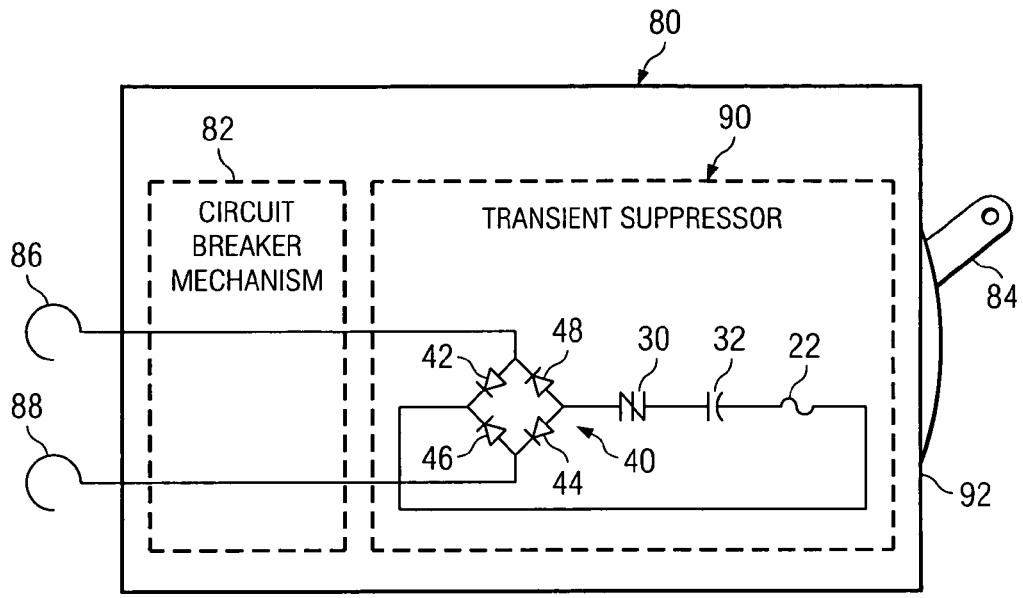
FIG. 4 is a diagram of a household circuit breaker employing the transient suppressor circuit of the invention.

FIG. 4 illustrates the transient suppressor circuit of the invention incorporated into a circuit breaker 80. The circuit breaker 80 is shown as a conventional type insertable into a household or office circuit breaker panel. The circuit breaker 80 includes the standard circuit breaker mechanism 82 for tripping in the event that the AC current drawn by the load exceeds the amperage rating of the circuit breaker 80. The circuit breaker mechanism 82 is mechanically coupled to a reset arm 83 that is manually operable to set or reset the circuit breaker mechanism 82. The circuit breaker mechanism 82 has metallic connections 86 and 88, one of which is connected to a bus bar in a circuit breaker panel (FIG. 6), and the other of which is connected to a ground bus bar.

Incorporated into the circuit breaker 80 is a transient suppression circuit 90 constructed according to the principles and concepts of the invention. The transient suppressor circuit 90 is essentially the same as that shown and described in connection with FIG. 2, except that a fuse 22 is connected in series with the overvoltage protection device 30 and the capacitor 32. Alternatively, the fuse 22 could be a manually-resettable circuit breaker. The fuse 22 is utilized as a failsafe device in the event that an overcurrent passing through the transient suppressor circuit 90 remains present for an extended period of time. While not shown, the fuse 22 can be mounted for easy replacement in the front surface 92 of the circuit breaker 80. The circuit breaker 80 can be used to protect all the electronic appliances and equipment connected to the AC circuit associated with the circuit breaker 80. Again, in the event that a non-polarized capacitor 32 is used, the diode bridge 40 is not needed.

Figure 5:
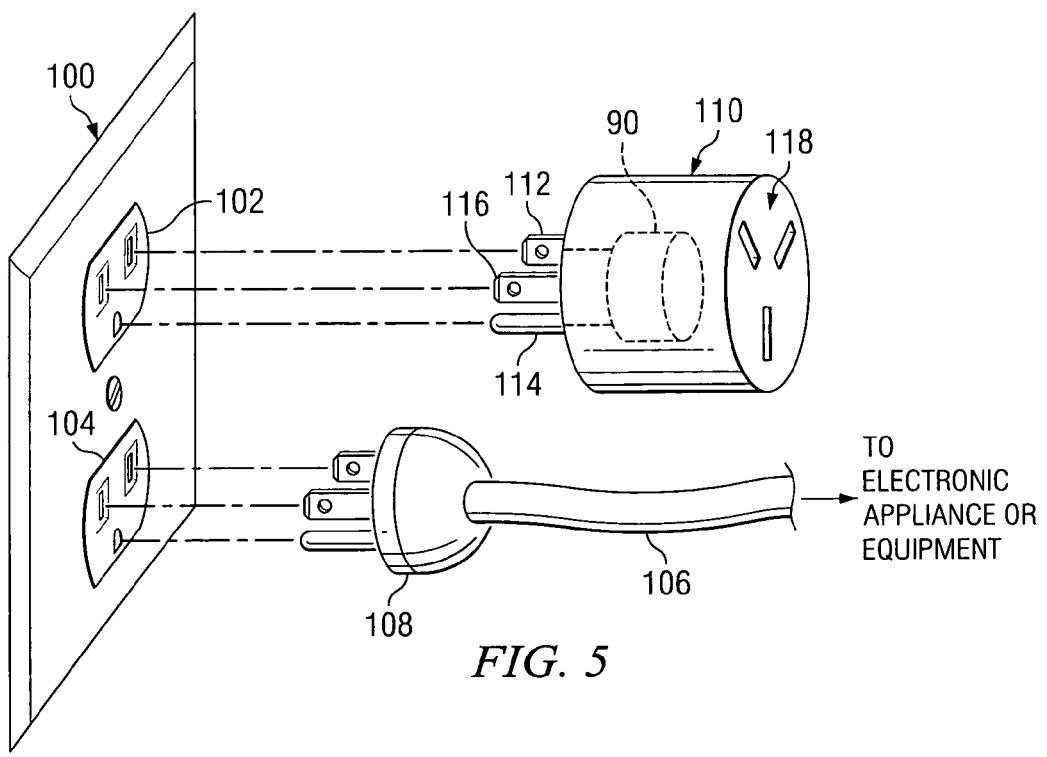
FIG. 5 is an isometric view of a modular transient suppressor circuit for use in an electrical outlet for protecting other circuits connected to the outlet circuit.

FIG. 5 illustrates yet another application of the transient suppressor circuit 90 of the invention. Shown is a conventional AC wall-mounted outlet 100. The outlet 100 includes dual receptacles 102 and 104 for receiving respective AC plugs. An AC cord 106 equipped with a standard plug 108 can be plugged into the wall outlet 100 to power electrical equipment such as computers, microwave ovens, fax machines, telephone equipment, printers, clocks, etc. Transient suppression protection is afforded by a module 110 which incorporates therein the transient suppressor circuit 90 shown in FIG. 4. The fuse 22 in this embodiment can be made replaceable by disassembly of the module 110. The module 110 has a hot AC lug that is pluggable into the corresponding socket of the wall outlet receptacle 102. The hot AC lug 112 is also connected internally in the module 110 to the transient suppressor circuit 90. The module 110 also includes a ground lug 114 that is pluggable into the corresponding socket 102 of the wall outlet receptacle 102, as well as connected to the transient suppressor circuit 90. Lastly, the neutral lug 116 of the module 110 is pluggable into the corresponding socket of the wall outlet 100, but not to the transient suppressor circuit 90. All three lugs 112, 114 and 116 are connected internally in the module 110 to corresponding sockets of a module receptacle 118 located on the frontal side of the module 110. In this manner, other electrical equipment to be protected from transient voltages can be plugged into the sockets of the module receptacle 118. Indeed, the line cord plug 108 can be plugged into the module receptacle 118 and provide transient voltage protection to the equipment receiving AC power from the line cord 106. With this arrangement, the utilization of the transient suppressor module 110 does not require any additional wall outlet receptacles.

Those skilled in the art may find that the transient suppressor circuit 90 can be fabricated as another type of module (not shown) and connected directly to the backside terminals of the wall outlet receptacle, inside the faceplate, and removed from access by users of the outlet 100. In other words, the transient suppressor circuit 90, with or without the diode bridge 40, can be mounted directly to the wiring terminals of the AC receptacle, and contained inside the wall outlet box. Such a module can be installed during initial installation of the wall outlet 100, or retrofitted at a later time. Alternatively, the transient voltage suppressor circuit 90 can be incorporated into the AC line cord plug 108 itself.

Figure 6:
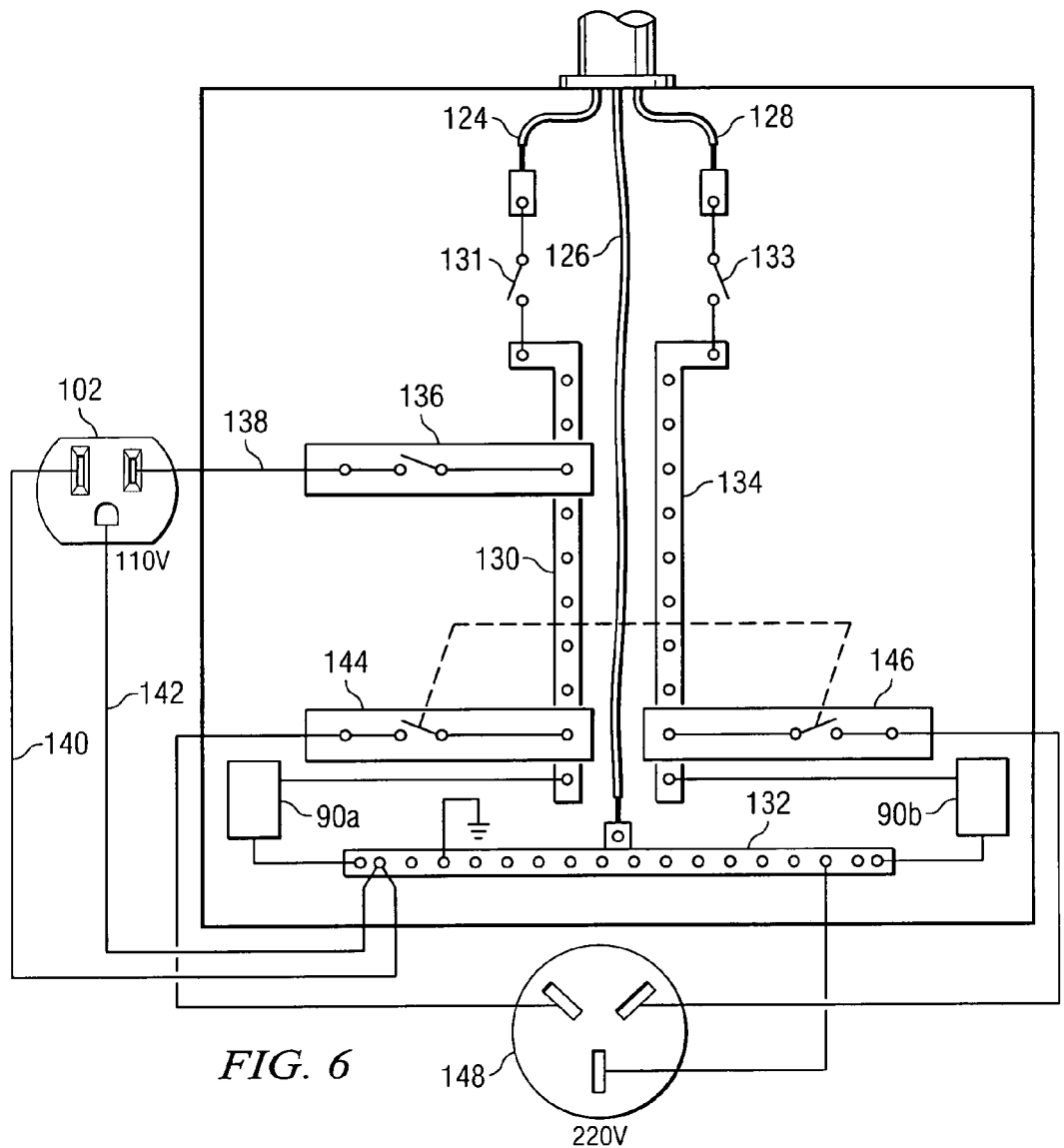
FIG. 6 is a frontal view of an AC power distribution panel equipped with the transient suppressor circuit of the invention.

FIG. 6 is a frontal view of a conventional circuit breaker panel 120. The circuit breaker panel 120 has an incoming conduit 122 through which heavy duty AC power conductors 124, 126 and 128 are routed. Generally, incoming AC power conductor 124 carries 110 AC power of one phase and incoming AC power conductor 128 carries AC power of another phase. Because of the phasing difference between the power carried by incoming AC power conductors 124 and 128, there is a 220 volt difference therebetween. The incoming AC power conductor 126 is a neutral or return conductor. The incoming AC power conductor 124 is connected to the bus bar 130 by way of a main circuit breaker 131. The other incoming AC power conductor 128 is connected to the other bus bar 134 by way of a main circuit breaker 133. The main circuit breakers 131 and 133 are mechanically ganged together so that if one circuit breaker trips, the other circuit breaker will be forced to trip also. The main circuit breaker 131 associated with incoming AC power conductor 124 is connected to a first power bus bar 130. The incoming neutral conductor 126 is connected to a ground bus bar 132. The circuit breaker 133 associated with other incoming AC power conductor 128 is connected to a second power bus bar 134.

For 110 volt AC power distribution, a circuit breaker 136 is normally connected between the first power bus bar 130 and the AC circuit 138 to be powered. The circuit breaker 136 is thus in series with the hot AC conductor feeding the AC circuit 138. The neutral wire 140 and the ground wire 142 associated with the AC circuit 138 are connected to the ground bus bar 132. Other circuit breakers can be used in series between the other power bus bar 134 and the AC hot wire servicing the associated AC circuit. For 220 volt operation, a ganged circuit breaker having circuit breaker portion 144 is connected between the first power bus bar 130 and a terminal of a 220 volt receptacle 148. The other circuit breaker portion 146 of the ganged breaker is connected between the power bus bar 134 and another terminal of the 220 volt receptacle 148. A third terminal of the 220 volt receptacle 148 is connected to the ground bus bar 132.

In accordance with an important feature of the invention, a first transient suppressor circuit 90a is connected between the first power bus bar 130 and the ground bus bar 132. The electronic equipment powered by the power bus bar 130 is thus protected from transient voltages superimposed on the first phase of the AC voltage. A second transient suppressor circuit 90b is connected between the second power bus bar 134 and the ground bus bar 132. The electronic equipment powered by the power bus bar 132 via circuit breakers will be protected from harm due to transient voltages superimposed on the second phase of the AC voltage. For 220 AC volt operation, any transient voltage superimposed on the AC power carried by either incoming AC power conductor 124 or 128 will be suppressed by the respective transient suppressor circuit 90a or 90b.

As an alternative to the use of transient suppressor circuits 90a and 90b connected to the power bus bars 130 and 134, the transient suppressor circuits 90a and 90b can be incorporated into the main circuit breakers 131 and 133. In this event, the main circuit breakers 131 and 133 would have to have terminals for connection to the ground bus bar 132.

Figure 7:
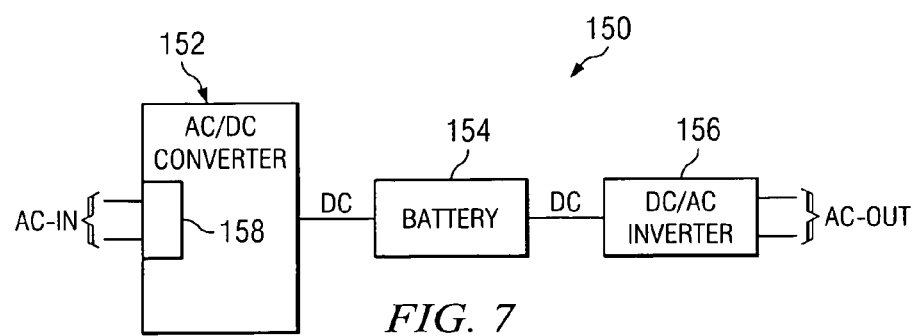
FIG. 7 illustrates an uninterruptible power supply embodying features of the invention.

FIG. 7 illustrates an electronic appliance in which the invention may be advantageously practiced. The electronic appliance is an uninterruptible power supply (UPS) 150 which includes an AC/DC converter 152 for converting the input AC voltage to a DC voltage coupled to a battery 154. The battery 154 provides a source of electrical power during an AC outage or unacceptable performance of the AC input utility voltage. The battery 154 supplies DC voltage to a DC/AC inverter 156. The DC/AC inverter 156 converts the DC voltage to an output AC voltage for replicating the characteristics of the utility AC voltage. The uninterruptible power supply 150 is of conventional design and is shown as a continuous type, but can also be of the standby type well known in the art.

The transient suppressor circuit 158 of the invention can be incorporated into the AC/DC converter to prevent transient voltages from propagating from the AC line to the circuits of the UPS 150. The transient suppressor circuit 158 can be of the type shown in FIG. 1 or FIG. 2, or other circuit design that includes the principles and concepts of the invention.

From the foregoing, disclosed are various embodiments of transient voltage suppressors adapted for use with AC power circuits. The transient voltage circuit includes at least two components, namely a low capacitance threshold device and capacitance having a relatively large value to provide a low impedance to the transient voltage energy. When placed in the AC power circuit, any transient voltage superimposed on the AC power will trigger the threshold device, and the large capacitance of the capacitor will provide a low impedance to the transient voltage energy to a reference potential, such as ground. The capacitor provides a high impedance to the AC voltage and thus the AC current is not shunted to ground. Nuisance blowing of AC line fuses is thus minimized.

While the preferred and other embodiments of the invention have been disclosed with reference to specific transient suppression circuits, it is to be understood that many changes in detail may be made as a matter of engineering choices without departing from the spirit and scope of the invention, as defined by the appended claims.

What is claimed is:

1. A transient voltage protection circuit for use with AC circuits, comprising:
    an AC power line conductor for providing AC power to the AC circuits;
    a transient suppressor circuit including a thyristor device and a capacitor, said thyristor device and said capacitor connected in series and to said AC power line conductor;
    said capacitor having a capacitance value presenting a low impedance to transient voltages and having a value sufficient to absorb the energy of the transient voltages and prevent damage to circuits using the AC power; and
    said AC power is not required to be interrupted or disconnected from downline circuits during suppression of the transient voltages.

2. The transient voltage protection circuit of claim 1, further including a neutral conductor, and wherein said transient suppressor circuit is connected between said AC power line conductor and said neutral conductor.

3. The transient voltage protection circuit of claim 1, wherein said transient suppressor circuit further includes a fuse connected in series with said thyristor device and said capacitor.

4. The transient voltage protection circuit of claim 1, wherein said capacitor comprises a polarized capacitor, and further including a diode bridge connected to said transient suppressor circuit.

5. The transient voltage protection circuit of claim 4, wherein said transient suppressor circuit is connected between opposite arms of said diode bridge.

6. The transient voltage protection circuit of claim 1, further including for use with a source of AC power operating at a frequency of between 50 and 400 Hz.

7. The transient voltage protection circuit of claim 1, wherein said thyristor device is a two-terminal avalanche device.

8. The transient voltage protection circuit of claim 7, wherein said thyristor device is characterized with a low capacitance to thereby present a high impedance to low frequency AC power when said thyristor device is in a non-conductive state.

9. The transient voltage protection circuit of claim 7, wherein said thyristor device comprises a bidirectional SIDACtor overvoltage protection device.

10. The transient voltage protection circuit of claim 1, wherein said capacitor has a value in the range of about 100 to 10,000 microfarads.

11. The transient voltage protection circuit of claim 1, further including in combination an electric appliance incorporating said transient suppressor circuit.

12. The transient voltage protection circuit of claim 11, further including in combination an AC to DC converter in said appliance, said AC converter incorporating said transient suppressor circuit.

13. The transient voltage protection circuit of claim 1, further including a module incorporating said transient suppressor circuit.

14. The transient voltage protection circuit of claim 13, further including plural lugs extending from said module and connected to said transient suppressor circuit, said lugs adapted for plugging into an outlet receptacle.

15. The transient voltage protection circuit of claim 1, further including in combination a circuit breaker incorporating therein said transient suppressor circuit.

16. The transient voltage protection circuit of claim 1, further including in combination a computer incorporating said transient suppressor circuit.

17. A transient voltage protection circuit for use with AC circuits, comprising:
  first and second AC power line conductors for providing AC power to the AC circuits;
  a thyristor having a low capacitance in a nonconductive state, and a breakover voltage which, when exceeded, drives said thyristor into a state of conduction, said low capacitance of said thyristor presenting a high impedance to a characteristic frequency of an AC voltage carried on at least one of said AC power line conductors;
  a capacitor connected in series with said thyristor so that said thyristor conducts current until said capacitor is charged to an instantaneous AC power line voltage, said capacitor having a large capacitance to provide a high impedance to the AC voltages carried on said AC power line conductor;
  said series-connected capacitor and thyristor connected across said first and second AC power line conductors to present a high impedance to AC voltages carried on said AC power line conductor and to present a low impedance for transient voltages superimposed on said AC voltage when said thyristor is in a state of conduction; and
  said AC power is not required to be interrupted or disconnected from downline circuits during suppression of the transient voltages.

18. The transient voltage protection circuit of claim 17, wherein said capacitor has a value in the range of about 100 microfarads to about 10,000 microfarads.

19. The transient voltage protection circuit of claim 17, wherein said thyristor is a two-terminal avalanche device.

20. The transient voltage protection circuit of claim 1, wherein said thyristor is a two-terminal avalanche device.

21. The transient voltage protection circuit of claim 1, wherein said capacitor allows said thyristor to conduct current until said capacitor is charged to an instantaneous AC power line voltage.

22. The transient voltage protection circuit of claim 1, wherein said AC power line conductor is of the type carrying AC power generated by a utility power company.

23. The transient voltage protection circuit of claim 1, wherein said capacitor does not form a filter with a resistor.

* * * * *